US011520643B2

(12) United States Patent
Miller et al.

(10) Patent No.: US 11,520,643 B2
(45) Date of Patent: Dec. 6, 2022

(54) CLIPBOARD OBJECT SHARING FOR INSTANT MESSAGING

(75) Inventors: Steven M. Miller, Cary, NC (US);
Lawrence Scott Rich, Cary, NC (US);
Ritchard L. Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 12/327,496

(22) Filed: Dec. 3, 2008

(65) Prior Publication Data

US 2010/0138502 A1   Jun. 3, 2010

(51) Int. Cl.
*H04L 51/04* (2022.01)
*G06F 9/54* (2006.01)
*H04L 51/214* (2022.01)

(52) U.S. Cl.
CPC .............. *G06F 9/543* (2013.01); *H04L 51/04* (2013.01); *H04L 51/214* (2022.05)

(58) Field of Classification Search
CPC ....... H04L 51/04; H04L 51/046; G06Q 10/10; G06F 9/543
USPC .................. 709/205, 206; 719/329
See application file for complete search history.

(56) References Cited

U.S. PATENT DOCUMENTS

| 8,406,252 | B1 * | 3/2013 | Wuthnow | ............ H04N 21/235 370/466 |
| 9,438,693 | B2 * | 9/2016 | Kolakeri | ................. H04L 67/36 |
| 2002/0056003 | A1 * | 5/2002 | Goswami | .................. G06F 9/54 709/227 |
| 2002/0120693 | A1 * | 8/2002 | Rudd et al. | .................... 709/206 |
| 2002/0178232 | A1 * | 11/2002 | Ferguson | ...................... 709/217 |
| 2004/0210846 | A1 * | 10/2004 | Olsen | ...................... H04L 29/06 715/761 |
| 2005/0004986 | A1 * | 1/2005 | Aoki | ....................... G06F 9/543 709/206 |
| 2005/0197906 | A1 * | 9/2005 | Kindig et al. | ................... 705/15 |
| 2005/0232232 | A1 * | 10/2005 | Farber | ................. H04W 88/181 370/352 |
| 2006/0036703 | A1 * | 2/2006 | Fulmer et al. | ................ 709/207 |

(Continued)

OTHER PUBLICATIONS

NightFalcon, "Disable 'Other users logged-on' warning on shutdown", Apr. 26, 2005, AnandTech.com, http://forums.anandtech.com/showthread.php?t=1585566, accessed on Sep. 29, 2010.*

*Primary Examiner* — Suraj M Joshi
*Assistant Examiner* — Sherman Lin
(74) *Attorney, Agent, or Firm* — Gilbert Harmon, Jr.; Aaron N. Pontikos

(57) ABSTRACT

Embodiments of the present invention address deficiencies of the art in respect to cut and paste object processing for instant messaging and provide a method, system and computer program product for clipboard object sharing for instant messaging. In an embodiment of the invention, a method for clipboard object sharing in an instant messaging session can include requesting transfer of a clipboard object from a source instant messaging client to a target instant messaging client in an instant messaging session, determining whether or not the target instant messaging client supports a format of the clipboard object, and transferring the clipboard object to the target instant messaging client only if the target instant messaging client supports the format of the clipboard object.

17 Claims, 2 Drawing Sheets

(56) References Cited

U.S. PATENT DOCUMENTS

| | | | |
|---|---|---|---|
| 2006/0133340 A1* | 6/2006 | Rybak | H04M 1/72436 370/338 |
| 2007/0078938 A1* | 4/2007 | Hu et al. | 709/206 |
| 2007/0079249 A1* | 4/2007 | Pall et al. | 715/758 |
| 2007/0288859 A1* | 12/2007 | Vuong et al. | 715/770 |
| 2008/0034043 A1* | 2/2008 | Gandhi | G06Q 10/00 709/206 |
| 2008/0133675 A1* | 6/2008 | Ramanathan | H04L 51/04 709/206 |
| 2008/0172463 A1* | 7/2008 | Qin | H04L 12/1822 709/204 |

\* cited by examiner

CLIPBOARD OBJECT SHARING FOR INSTANT MESSAGING

BACKGROUND OF THE INVENTION

Field of the Invention

The present invention relates to the field of instant messaging and more particularly to the field file sharing in an instant messaging session.

Description of the Related Art

Messaging forms the heart of the Internet. The Internet with its global, continuous reach enables interpersonal activities from afar, including both asynchronous messaging like e-mail and document sharing and threaded discussions, to real time communications systems such as instant messaging and group chat. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications systems lack several elements common in the realm of real time communications systems. In particular, the seemingly instant delivery of a message cannot be experienced in the world of electronic mail. In a real-time society, the minor latencies associated with electronic mail often cannot be suitable for the task at hand where a real-time conversation will be required in addressing a problem or performing a collaborative task. More importantly, often the feel and nature of a "conversation" as it is known to human beings only can be approximated through real time communications where the participants to a conversation feel the spontaneity of an exchange of ideas, much as is the case in a live, face-to-face conversation. Thus, the instant messaging environment has proven to be an invaluable compliment to e-mail as a real-time conversational mechanism.

Modern instant messaging provides the ability for conversants to exchange not only text messages as part of a conversation, but also files through an attachment mechanism analogous to the attachment of a file to e-mail. Operationally, a sending conversant can upload a file into a chat client and request that the uploaded file be transferred to a recipient conversant. As a result, the instant messaging client for the recipient conversant can receive notice of the request to transfer the file and, given the permission of the recipient conversant, the file can be downloaded into the instant messaging client of the recipient conversant.

Notably, while conversants can exchange minimalist information through text and robust information through the attachment of a file, no intermediate mechanism exists for transferring complex data as a subset of a file without transferring the entirety of the file itself in an instant messaging session. Specifically, most computing users have long been familiar with the cut and paste mechanism through which complex data within a source file can be transferred to a target file. Utilizing an application referred to as the "clipboard", the editor for the target file can recognize the format of the complex data in the clipboard and account for the proper handling of the complex data during the paste portion of the cut and paste operation.

The ease in which cut and paste works for ordinary productivity applications like word processors and spreadsheets generally is absent in the instant messaging environment. Rather, in the instant messaging environment, cut and paste operations for clipboard objects are limited to textual representations of the clipboard objects, or image snapshots in lieu of higher fidelity clipboard objects. In the former circumstance, the native format of the clipboard object is not preserved within the instant messaging session. In the latter circumstance, the data is preserved only for purposes of viewing and cannot be edited once received by a recipient conversant in the instant messaging session. In both circumstances, the context of the clipboard object is lost.

BRIEF SUMMARY OF THE INVENTION

Embodiments of the present invention address deficiencies of the art in respect to cut and paste object processing for instant messaging and provide a novel and non-obvious method, system and computer program product for clipboard object sharing for instant messaging. In an embodiment of the invention, a method for clipboard object sharing in an instant messaging session can include requesting transfer of a clipboard object from a source instant messaging client to a target instant messaging client in an instant messaging session, determining whether or not the target instant messaging client supports a format of the clipboard object, and transferring the clipboard object to the target instant messaging client only if the target instant messaging client supports the format of the clipboard object. Optionally, the clipboard object can be selected from a saved transcript of a previous instant messaging session and the transfer of the selected clipboard object can be effectuated for the clipboard object in the saved transcript.

In one aspect of the embodiment, the method also can include deferring a transfer of the clipboard object to the target instant messaging client if the target instant messaging client does not support the format of the clipboard object until such time as the target instant messaging client supports the format of the clipboard object. In another aspect of the embodiment, transferring the clipboard object to the target instant messaging client can include transferring the clipboard object to the target instant messaging client as a background task in the target instant messaging client, rendering a placeholder image inline in a transcript of the instant messaging session in the target instant messaging client while transferring the clipboard object, and replacing the placeholder image with an inline image of the clipboard object once the background task has completed. In even yet another aspect of the embodiment, the transfer of the clipboard object can occur directly between the source and target instant messaging clients bypassing an instant messaging server managing the instant messaging session.

In yet another aspect of the embodiment, the method can include placing a representative image of all clipboard objects transferred into the target instant messaging client in a portion of the instant messaging client outside of the transcript. In even yet another aspect of the embodiment, transferring the clipboard object to the target instant messaging client only if the target instant messaging client supports the format of the clipboard object can include first selecting a clipboard object already transferred to the target instant messaging client from a saved transcript of a previous instant messaging session between the source instant messaging client and the target instant messaging client. Subsequently, the selected clipboard object can be retrieved from the saved transcript.

Finally, in even yet another aspect of the embodiment, the method can include detecting a request to close the instant messaging session. In response to detecting the request, a warning of the background task can be prompted before permitting a closing of the instant messaging session.

In another embodiment of the invention, an instant messaging data processing system can be configured for clipboard object sharing. The system can include instant messaging clients executing corresponding host computing devices and being coupled to one another over a computer communications network. The system also can include integrated clipboard handling logic coupled to a corresponding one of the instant messaging clients. The logic can include program code enabled to compare supported clipboard object formats in respective ones of the host computing devices, and to transfer a clipboard object in a specific format from one of the instant messaging clients to another only when a recipient of the instant messaging clients supports the specific format.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for clipboard object sharing in an instant messaging session. In accordance with an embodiment of the present invention, a clipboard object can be transferred from a source conversant in an instant messaging conversation to a target conversant to the instant messaging conversation to the extent that a format for the clipboard object is supported by the target conversant. The transfer can be performed as a background task while a placeholder image of the clipboard object is displayed in an instant messaging client for the target conversant. Once the transfer has competed, the placeholder image can be replaced with a different, representative image of the clipboard object. In this way, clipboard objects with inherent context can be transferred from within an instant messaging session in a seamless manner consistent with that long experienced in traditional productivity applications.

Figure 1:
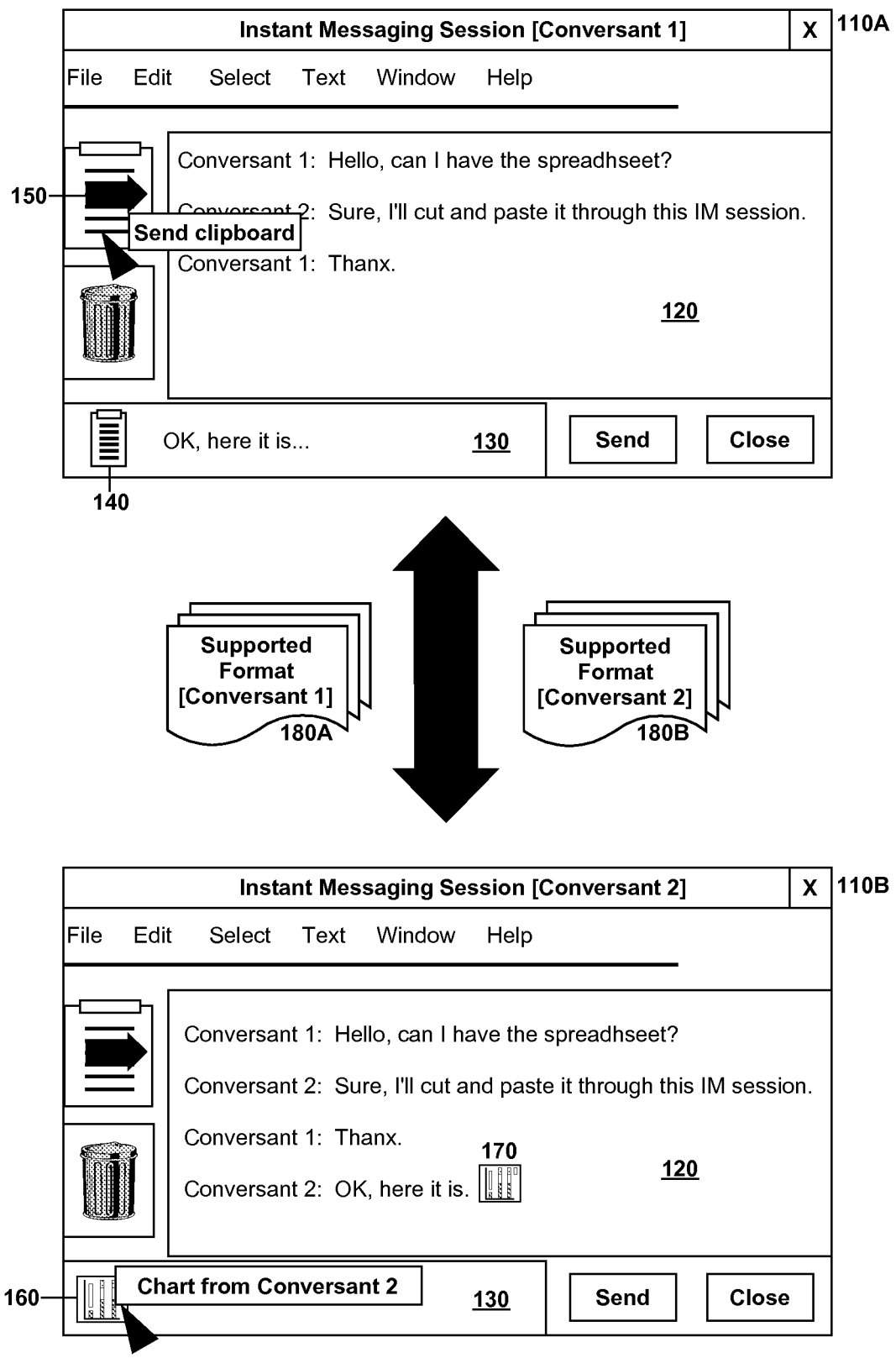
FIG. 1 is a pictorial illustration of an instant messaging session supporting clipboard object sharing.

In illustration, FIG. 1 pictorially shows an instant messaging session supporting clipboard object sharing. As shown in FIG. 1, an instant messaging session can be established between conversants, each enjoying a separate instant messaging client 110A, 110B. Each instant messaging client 110A, 110B can include a conversation transcript 120, a text entry field 130 into which instant messages can be composed, a clipboard indicator 140 indicating whether the clipboard holds at present a clipboard object able to be pasted into a target application, and a clipboard transmission control 150 configured to transmit the clipboard object in the clipboard to a target conversant to the instant messaging session.

Notably, when establishing the instant messaging session between the conversants, the supported formats 180A, 180B for clipboard objects can be exchanged as between the conversants to ensure that only clipboard objects known to a particular one of the conversants can be received by the particular one of the conversants. Exemplary formats include well-known word processor, spreadsheet, image, audio, video and presentation formats, to name only a few formats. Specifically, when attempting to transfer a clipboard object to a particular one of the conversants as the result of the activation of the clipboard transmission control 150, it can be determined by the particular one of the conversants whether or not the format of the clipboard object is supported. If so, the object can be received into the clipboard of the particular one of the conversants.

Once the clipboard object has been confirmed to have a supported format, a placeholder image (not shown) can be placed inline within the transcript 120 indicating the transfer of the clipboard object. Concurrently, the clipboard object can be transferred as a background task into the instant messaging client 110B. Once the clipboard object has been successfully transferred, the placeholder image (not shown) can be replaced with an inline image 170 in the transcript 120 to provide context for the clipboard object with respect the instant messaging conversation reflected by the transcript 120. Further, a corresponding representative image 160 can be displayed in the instant messaging client 110B to indicate the accessibility of the clipboard object from the instant messaging client 110B. Notably, multiple representative images 160 for different clipboard objects can be displayed in the instant messaging client 110B to provide a visual history of cut and paste/clipboard operations in the instant messaging client.

Figure 2:
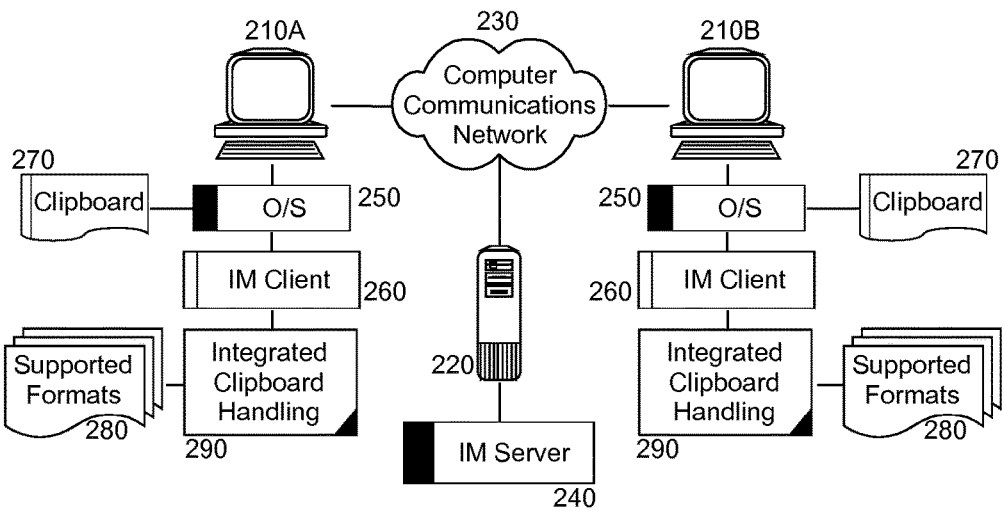
FIG. 2 is a schematic illustration of an instant messaging data processing system configured for clipboard object sharing; and, FIG. 3 is a flow chart illustrating a process for clipboard object sharing in an instant messaging session.

The process described in connection with FIG. 1 can be performed within an instant messaging data processing system. In illustration, FIG. 2 schematically shows an instant messaging data processing system configured for clipboard object sharing. The system can include two or more host computing systems 210A, 210B communicatively coupled to one another over computer communications network 230, for example the global Internet. The host computing systems 210A, 210B further can be coupled to a host server 220 over the computer communications network 230, the host server 220 hosting the operation of an instant messaging server 240.

Each of the host computing systems 210A, 210B can include an operating system 250 supporting the operation of an instant messaging client 260 through which an instant messaging session can be supported in cooperation with the instant messaging server 240. Yet further, the instant messaging client 260 can include integrated clipboard handling logic 290. The integrated clipboard handling logic 290 can include program code enabled to transfer a clipboard object one IM client 260 in one host computing system 210A from the clipboard 270 of the host computing system 210A to another IM client 260 in another host computing system 210B to the extent that a format for the clipboard object is a supported format in the host computing system 210B. In this regard, the program code further can be enabled to compare supported formats 280 for each of the host computing systems 210A, 210B when establishing an instant messaging session there between.

Figure 3:
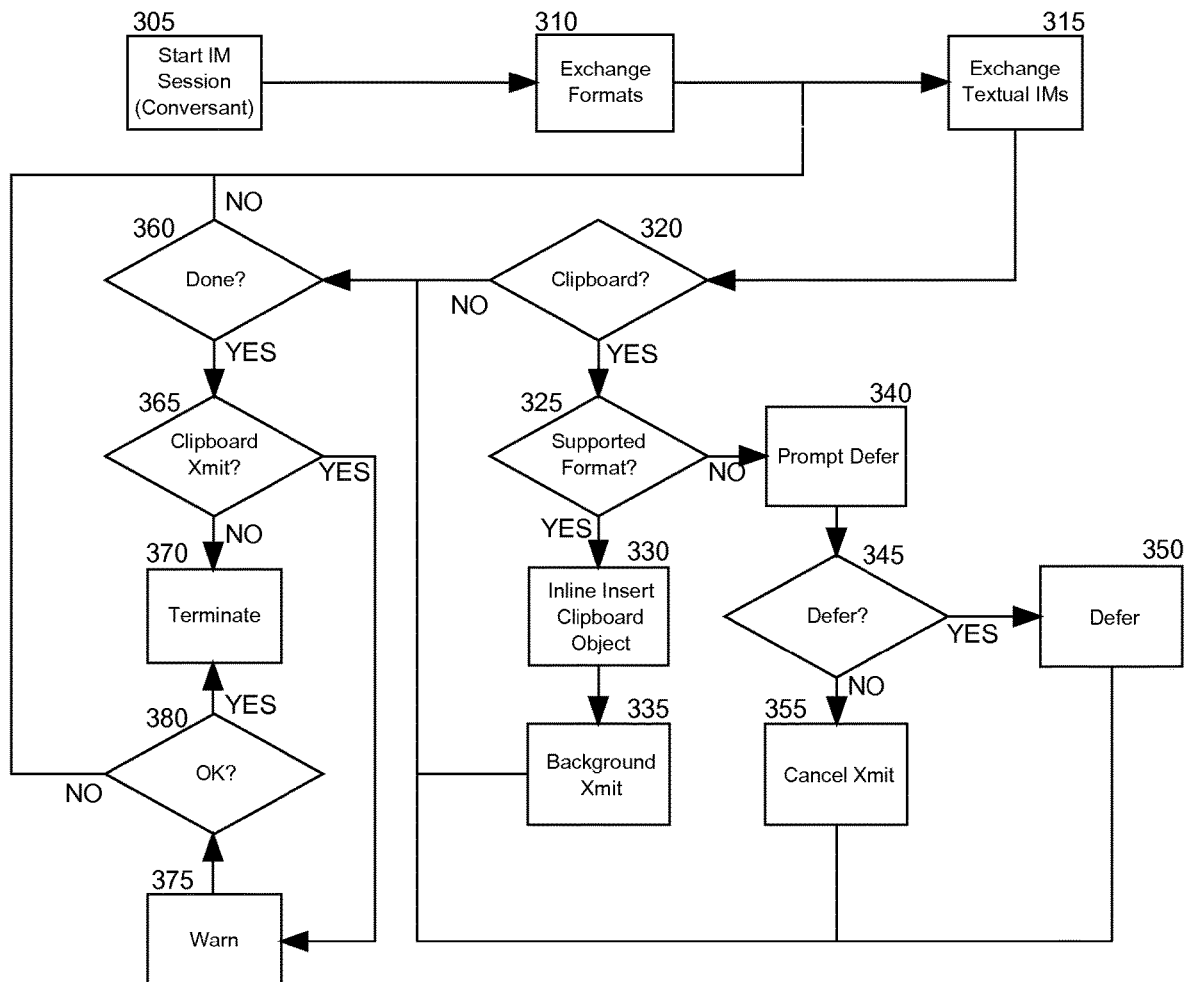

In yet further illustration of the operation of the integrated clipboard handling logic 290, FIG. 3 is a flow chart illustrating a process for clipboard object sharing in an instant messaging session. Beginning in block 305, an instant messaging session can be started between conversants. In block 310, the supported formats for each of the conversants can be exchanged so as to provide a priori knowledge of the types of clipboard object formats that can be read within a corresponding application in a host computing platform for each of the conversants.

In block 315, textual instant messages can be exchanged within the instant messaging session. In decision block 320, it can be determined whether or not a clipboard object is to be transferred from a source one of the conversants to a target one of the conversants through the instant messaging session. In this regard, the clipboard object can be selected from a chat history or saved transcript of a prior instant messaging session. If so, in decision block 325, it can be determined whether or not the target can support a format associated with the clipboard object. If so, in block 330, the clipboard object can be inserted inline into a chat transcript for the instant messaging session so that a placeholder image is placed within the instant messaging client of the target indicating the occurrence of a clipboard object transfer.

Concurrently, in block 335 the clipboard object can be transferred to the target as a background task and once complete, the placeholder image can be replaced with a representative image. Optionally, rather than route the clipboard object through an instant messaging server managing the instant messaging session, the peer-to-peer communicative link can be established directly between the conversants outside of the instant messaging server and the clipboard object can be transferred over the communicative link. In this way, clipboard objects that are large in size can be transferred between the conversants in a more efficient manner.

In contrast, in decision block 325, if the target cannot support the format associated with the clipboard object, in block 340 a prompt can solicit a deferral of the transfer until such time as the target supports the desired format. In decision block 345, if a deferral of the transfer is selected, in block 350 the transfer can be deferred. Otherwise, in block 355 the transfer can be cancelled. Though not illustrated with specificity, in the former circumstance, a placeholder object still can be rendered in the instant messaging client of the target and the instant messaging client of the target can periodically inspect whether or not the format becomes supported by the target. If so, the target can solicit the transfer of the clipboard object from the source at that time.

In either case, in decision block 360, it can be determined whether the instant messaging session has completed. If so, in block 365 it can be determined whether or not a background transfer of a clipboard object is underway. If not, in block 370 the instant messaging session simply can terminate. However, if it is determined that a background transfer of a clipboard object is underway, in block 375 a warning can be issued and in decision block 380 if it is determined that the instant messaging session is to close in any case, the instant messaging session can terminate in block 370. Otherwise, the additional textual instant messages can be exchanged in block 315.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable storage medium can be any apparatus that can contain or store the program for use by or in connection with the instruction execution system, apparatus, or device. The storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for clipboard object sharing in an instant messaging session, the method comprising:
   establishing an instant messaging session between a source instant messaging client and a target instant messaging client;
   exchanging a list of supported clipboard object formats between the source and target instant messaging clients, the source instant messaging client transmitting to the target instant messaging client a list of different clipboard object formats supported by a paste operation in the source instant messaging client, the target instant messaging client transmitting to the source instant messaging client a list of different clipboard object formats supported by a paste operation in the target instant messaging client;

requesting transfer of a clipboard object resulting from having been placed in a clipboard area of memory of a computer from a cut-copy-paste type operation from the source instant messaging client for pasting into the target instant messaging client during the instant messaging session, wherein the clipboard object is transferred through a peer-to-peer communication link without traversing an instant messaging server associated with the instant messaging session;

determining whether the target instant messaging client supports a format of the clipboard object based upon the exchanged list received from the target instant messaging client by locating in the exchanged list, the format of the clipboard object requested for transfer from the source instant messaging client to the target instant messaging client, and displaying in a user interface of the target instant messaging client a clipboard indicator indicating whether or not the clipboard holds a clipboard object able to be pasted into the target instant messaging client;

in response to determining that the target instant messaging format supports the format of the clipboard object, transferring the clipboard object to the target instant messaging client as a paste only if the target instant messaging client supports the format of the clipboard object but otherwise displaying a prompt in the target instant messaging client to defer pasting of the clipboard object received from the source instant messaging client and rendering a placeholder object in the in the target instant messaging client allowing the target instant messaging client to solicit transfer of the clipboard object when the format becomes supported by the target instant messaging client based on periodically inspecting the target for support of the format; and, displaying each received clipboard object of a format supported by the target instant messaging client inline in a text messaging field of the target instant messaging client, while concurrently displaying in a separate portion of the target instant messaging client, a sequence of icons for other received clipboard objects also of a format supported by the target instant messaging client.

2. The method of claim 1, further comprising deferring a transfer of the clipboard object to the target instant messaging client if the target instant messaging client does not support the format of the clipboard object until such time as the target instant messaging client supports the format of the clipboard object.

3. The method of claim 1, further comprising deferring a transfer of the clipboard object to the target instant messaging client until the target instant messaging client requests delivery of the clipboard object in the specified format.

4. The method of claim 1, wherein requesting transfer of a clipboard object from a source instant messaging client to a target instant messaging client in an instant messaging session, comprises:

selecting a clipboard object already transferred to the target instant messaging client from a saved transcript of a previous instant messaging session between the source instant messaging client and the target instant messaging client; and, retrieving the selected clipboard object from the saved transcript.

5. The method of claim 1, wherein transferring the clipboard object to the target instant messaging client, comprises:

transferring the clipboard object to the target instant messaging client as a background task in the target instant messaging client;

rendering a placeholder image inline in a transcript of the instant messaging session in the target instant messaging client while transferring the clipboard object; and, replacing the placeholder image with an inline image of the clipboard object once the background task has completed.

6. The method of claim 1, wherein transferring the clipboard object to the target instant messaging client, comprises transferring the clipboard object to the target instant messaging client directly from the source instant messaging client bypassing an instant messaging server managing the instant messaging session.

7. The method of claim 1, further comprising placing a representative image of all clipboard objects transferred into the target instant messaging client in a portion of the instant messaging client outside of the transcript.

8. The method of claim 1, further comprising:

detecting a request to close the instant messaging session; and, prompting a warning of the background task responsive to the request before permitting a closing of the instant messaging session.

9. An instant messaging data processing system configured for clipboard object sharing, the system comprising:

a plurality of instant messaging clients executing corresponding host computing devices and being coupled to one another over a computer communications network; and, integrated clipboard handling logic coupled to a target one of the instant messaging clients executing in memory of a corresponding one of the host computing devices, the logic comprising program code enabled to exchange with a source one of the instant messaging clients when establishing an instant messaging session with the source one of the instant messaging clients, one or more different lists of supported clipboard object formats, the source instant messaging client transmitting to the target instant messaging client a list of different clipboard object formats supported by a paste operation in the source instant messaging client, the target instant messaging client transmitting to the source instant messaging client a list of different clipboard object formats supported by a paste operation in the target instant messaging client, to compare supported clipboard object formats in respective ones of the host computing devices in order to determine whether or not the target one of the instant messaging clients supports a format of the clipboard object based upon one of the different lists received from the target instant messaging client by locating in the exchanged list, the format of the clipboard object requested for transfer from the source instant messaging client to the target instant messaging client, displaying in a user interface of the target one of the instant messaging clients a clipboard indicator indicating whether or not the clipboard holds a clipboard object able to be pasted into the target one of the instant message clients, and, in response to determining that the target instant messaging format supports the format of the clipboard object, to transfer a clipboard object residing in clipboard area of memory of the target one of the instant messaging clients resulting from a cut-copy-paste type operation in a specific format from the source one of the instant messaging clients as a paste only when an exchanged one of the different lists for the target one of the instant messaging clients indicates that the target recipient one of the instant messaging clients supports the specific format, wherein the clipboard object is transferred through a peer-to-peer communication link without traversing an instant messaging server associated with the instant messaging clients, but otherwise displaying a prompt in the target instant messaging client to defer pasting of the clipboard object received from the source instant messaging client and rendering a placeholder object in the in the target instant messaging client allowing the target instant messaging client to solicit transfer of the clipboard object when the format becomes supported by the target instant messaging client based on periodically inspecting the target for support of the format; and, displaying each received clipboard object of a format supported by the target instant messaging client inline in a text messaging field of the target instant messaging client, while concurrently displaying in a separate portion of the target instant messaging client, a sequence of icons for other received clipboard objects also of a format supported by the target instant messaging client.

10. A computer program product comprising a non-transitory computer usable medium embodying computer usable program code for clipboard object sharing in an instant messaging session, the computer program product comprising:

computer usable program code for establishing an instant messaging session between a source instant messaging client and a target instant messaging client through an instant messaging server;

computer usable program code for exchanging a list of supported clipboard object formats between the source and target instant messaging clients, the source instant messaging client transmitting to the target instant messaging client a list of different clipboard object formats supported by a paste operation in the source instant messaging client, the target instant messaging client transmitting to the source instant messaging client a list of different clipboard object formats supported by a paste operation in the target instant messaging client;

computer usable program code for requesting transfer of a clipboard object resulting from having been placed in a clipboard area of memory of a computer from a cut-copy-paste type operation from the source instant messaging client for pasting into the target instant messaging client during the instant messaging session, wherein the clipboard object is transferred through a peer-to-peer communication link without traversing an instant messaging server associated with the instant messaging session;

computer usable program code for determining whether the target instant messaging client supports a format of the clipboard object based upon the exchanged list received from the target instant messaging client by locating in the exchanged list, the format of the clipboard object requested for transfer from the source instant messaging client to the target instant messaging client, and displaying in a user interface of the target instant messaging client a clipboard indicator indicating whether or not the clipboard holds a clipboard object able to be pasted into the target instant messaging client;

computer usable program code for responding to a determination that the target instant messaging format supports the format of the clipboard object by transferring the clipboard object to the target instant messaging client as a paste only if the target instant messaging client supports the format of the clipboard object but otherwise displaying a prompt in the target instant messaging client to defer pasting of the clipboard object received from the source instant messaging client and rendering a placeholder object in the in the target instant messaging client allowing the target instant messaging client to solicit transfer of the clipboard object when the format becomes supported by the target instant messaging client based on periodically inspecting the target for support of the format; and, computer usable program code for displaying each received clipboard object of a format supported by the target instant messaging client inline in a text messaging field of the target instant messaging client, while concurrently displaying in a separate portion of the target instant messaging client, a sequence of icons for other received clipboard objects also of a format supported by the target instant messaging client.

11. The computer program product of claim 10, further comprising computer usable program code for deferring a transfer of the clipboard object to the target instant messaging client if the target instant messaging client does not support the format of the clipboard object until such time as the target instant messaging client supports the format of the clipboard object.

12. The computer program product of claim 10, further comprising computer usable program code for deferring a transfer of the clipboard object to the target instant messaging client until the target instant messaging client requests delivery of the clipboard object in the specified format.

13. The computer program product of claim 10, wherein the computer usable program code for requesting transfer of a clipboard object from a source instant messaging client to a target instant messaging client in an instant messaging session, comprises:

computer usable program code for selecting a clipboard object already transferred to the target instant messaging client from a saved transcript of a previous instant messaging session between the source instant messaging client and the target instant messaging client; and, computer usable program code for retrieving the selected clipboard object from the saved transcript.

14. The computer program product of claim 10, wherein the computer usable program code for transferring the clipboard object to the target instant messaging client, comprises:

computer usable program code for transferring the clipboard object to the target instant messaging client as a background task in the target instant messaging client;

computer usable program code for rendering a placeholder image inline in a transcript of the instant messaging session in the target instant messaging client while transferring the clipboard object; and, computer usable program code for replacing the placeholder image with an inline image of the clipboard object once the background task has completed.

15. The computer program product of claim 10, wherein the computer usable program code for transferring the clipboard object to the target instant messaging client, comprises computer usable program code for transferring the clipboard object to the target instant messaging client directly from the source instant messaging client bypassing an instant messaging server managing the instant messaging session.

16. The computer program product of claim 10, further comprising computer usable program code for placing a representative image of all clipboard objects transferred into the target instant messaging client in a portion of the instant messaging client outside of the transcript.

17. The computer program product of claim 10, further comprising:
   computer usable program code for detecting a request to close the instant messaging session; and,
   computer usable program code for prompting a warning of the background task responsive to the request before permitting a closing of the instant messaging session.

\* \* \* \* \*